(12) United States Patent
Choi et al.

(10) Patent No.: US 11,431,041 B2
(45) Date of Patent: *Aug. 30, 2022

(54) BATTERY MODULE

(71) Applicant: SK INNOVATION CO., LTD., Seoul (KR)

(72) Inventors: Young-Sun Choi, Daejeon (KR); Tae-Gu Lee, Daejeon (KR); Seung-Hoon Ju, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,720

(22) Filed: Mar. 2, 2021

(65) Prior Publication Data
US 2021/0184285 A1 Jun. 17, 2021

Related U.S. Application Data

(62) Division of application No. 16/315,914, filed as application No. PCT/KR2017/004960 on May 12, 2017, now Pat. No. 10,964,981.

(30) Foreign Application Priority Data

Jul. 13, 2016 (KR) .......................... 10-2016-0088426

(51) Int. Cl.
| | | |
|---|---|---|
| *H01M 10/613* | (2014.01) |
| *H01M 10/625* | (2014.01) |
| *H01M 10/6551* | (2014.01) |
| *H01M 10/6555* | (2014.01) |
| *H01M 10/658* | (2014.01) |

(52) U.S. Cl.
CPC ....... *H01M 10/613* (2015.04); *H01M 10/625* (2015.04); *H01M 10/658* (2015.04); *H01M 10/6551* (2015.04); *H01M 10/6555* (2015.04)

(58) Field of Classification Search
CPC ............. H01M 10/613; H01M 10/625; H01M 10/6551; H01M 10/6555; H01M 10/658; Y02E 60/10
See application file for complete search history.

(56) References Cited

FOREIGN PATENT DOCUMENTS

| | | |
|---|---|---|
| CN | 102473978 A | 5/2012 |
| JP | 2016-058285 * | 4/2016 |

(Continued)

OTHER PUBLICATIONS

English translation of KR Publication 2016-0068446, Jun. 2016.*

(Continued)

*Primary Examiner* — Brittany L Raymond
(74) *Attorney, Agent, or Firm* — IP & T Group LLP

(57) ABSTRACT

The present invention provides a battery module comprising: a plurality of battery cells of which the horizontal length of a front surface is formed to be longer than the vertical length and which are vertically stacked; a cooling fin which has a first cooling part contacting an upper and lower surface of adjacent battery cells, and a second cooling part extending from both side surfaces of the first cooling part and contacting both side surfaces of the battery cells which are in contact with the first cooling part; and a side cooling fin which has an ground part contacting a side surface of the second cooling part of the cooling fin, and contacting a heat sink located in a lower part.

9 Claims, 5 Drawing Sheets

(56) References Cited

FOREIGN PATENT DOCUMENTS

| | | | |
|---|---|---|---|
| JP | 2016-058285 | A | 4/2016 |
| KR | 10-2012-0086657 | A | 8/2012 |
| KR | 10-2013-0062056 | A | 6/2013 |
| KR | 10-2015-0035270 | A | 4/2015 |
| KR | 2015-0035270 | * | 4/2015 |
| KR | 10-2015-0083438 | A | 7/2015 |
| KR | 10-2015-0117521 | A | 10/2015 |
| KR | 10-2016-0068446 | A | 6/2016 |
| KR | 2016-0068446 | * | 6/2016 |

OTHER PUBLICATIONS

English translation of JP Publication 2016-058285, Apr. 2016.*
English translation of KR Publication 2015-0035270, Apr. 2015.*
Office Action issued by the China Intellectual Property Office dated Apr. 19, 2021.

* cited by examiner

BATTERY MODULE

CROSS-REFERENCE TO RELATED APPLICATION(S)

This application is a division of U.S. patent application Ser. No. 16/315,914 filed on Jan. 7, 2019, which is a national stage application of PCT/KR2017/004960 filed on May 12, 2017, which claims priority of Korean patent application number 10-2016-0088426 filed on Jul. 13, 2016. The disclosure of each of the foregoing application is incorporated herein by reference in its entirety.

TECHNICAL FIELD

The present invention relates to a battery module reducing overall height and improving cooling performance.

BACKGROUND ART

As the development of electronic technology continues, the technological development of battery modules storing electric charges is continuing, and, as a part of this technological development, technologies such as an electric vehicle, or the like, as a driving source are being developed.

In such electric vehicle, improving battery performance and capacity so as to be able to run for a long distance on a single charge is being attempted, and further, research into improving the stability by applying a low height to the battery module are being conducted.

In a battery module mounted in an electric vehicle of the related art, the reliability and stability of a battery system are the most important factors in determining the commerciality of an electric vehicle. Therefore, a cooling means for cooling a battery cell is provided to prevent deterioration of battery performance due to various external temperature changes. As an example of the cooling means, a heat sink, in contact with a battery cell to dissipate heat, is included, and a water-cooled cooling means may be further connected to the heat sink or provided inside of the heat sink.

The heat sink is located in a lower portion of the battery cell, and such a dispositional structure is widely used for avoiding interference due to facilities such as piping for the circulation of cooling water, and the like, for stable ease of installation and assembly, and the like.

In a battery module 1 in the related art, as illustrated in FIG. 1, a battery cell 10 is vertically disposed in an upper portion of a heat sink 30 and a cooling fin 20 having a first cooling part 22 contacting between adjacent battery cells 10 and a second cooling part 24 contacting a lower portion of each battery cell 10 in a lower portion of the first cooling part 22 is disposed. The cooling fin 20 is provided in a structure in which the cooling fin 20 is in contact with the heat sink 30 to transfer heat generated in the battery cell 10 to the heat sink 30 to dissipate heat.

However, the battery module 1 in the related art is disposed in a state of standing upright with the heat sink 30, and there is a limitation in lowering the height of the battery module 1, according to such a disposition structure.

In addition, although in the battery module 1 of the related art, it has been attempted to increase the thickness of the battery cell 10 instead of reducing the height of the battery cell 10 in order to reduce overall height, a method of increasing the thickness of the battery cell 10 has also been attempted, but is has not widely used due to the deterioration of a heat radiation effect according to an increase in the thickness of the battery cell 10, and the like.

DISCLOSURE

Technical Problem

An aspect of the present disclosure to solve the problems of the related art is to provide a battery module having an improved structure wherein battery cells are installed laid down, such that the overall height thereof is reduced and cooling performance is improved.

Technical Solution

A battery module according to an aspect of the present disclosure is a battery module including battery cells, and a heat sink connected to the battery cells by a medium of a cooling fin and which cools the heat of the battery cells, the battery module comprising: a plurality of battery cells of which a horizontal length of a front surface is formed to be longer than a vertical length, and which are vertically stacked; a cooling fin having a first cooling part contacting upper and lower surfaces of adjacent battery cells, and a second cooling part extending from both side surfaces of the first cooling part and contacting both side surfaces of the battery cells in contact with the first cooling part; and a side cooling fin having an ground part contacting a side surface of the cooling fin, and contacting a heat sink located in a lower portion.

Further, an insulation member provided in a lower portion of the battery cell adjacent to the heat sink may be further included.

Further, a conductive member provided between the cooling fin and the side cooling fin may be further included.

Preferably, an area of the conductive member provided from an upper portion to a lower portion may be reduced.

Further, a conductive member provided between an ground part of the side cooling fin and the heat sink may be further included.

Further, the side cooling fin may include notch grooves formed corresponding to respective battery cells on a surface contacting the cooling fin, and increased to decrease a contact area with the cooling fin as to be adjacent to the heat sink.

Further, the side cooling fin may include a protrusion part formed on a surface facing the notch grooves to compensate for a heat transfer cross-sectional area of the side cooling fin.

Further, the thickness of the side cooling fin may be reduced such that the heat transfer cross-sectional area decreases as to be adjacent to the heat sink.

Further, the cooling fin may be formed by dividing a part of the first cooling part.

Advantageous Effects

According to an exemplary embodiment in the present disclosure, an overall height of a battery module may be reduced, and according to the structural improvement, and a center of gravity of a vehicle on which the battery module is mounted may be lowered, and a degree of freedom of design of the vehicle may be improved.

In addition, since the battery module in the present disclosure is cooled on both sides of the battery cell, it is possible to cool the battery module more quickly and uniformly, thereby improving overall cooling performance, thereby contributing to the improvement of the battery module.

BEST MODE FOR INVENTION

Figure 1:
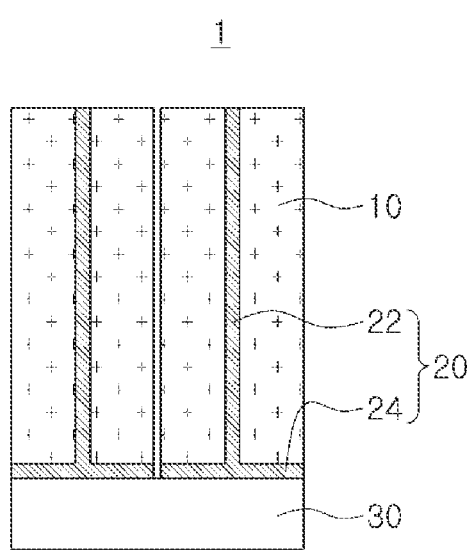
FIG. 1 is a cross-sectional view of a battery module according to the related art.

Hereinafter, exemplary embodiments of the present disclosure will be described in detail with reference to the accompanying drawings. In the following description, when describing the embodiments in detail, only embodiments necessary for understanding of functions and configuration according to embodiments in the present disclosure will be described and other embodiments may be omitted, so as not to obscure the subject matter of the present disclosure. In addition, the same reference numerals will be used throughout the drawings for elements having the same or similar functions and operations.

Figure 2:
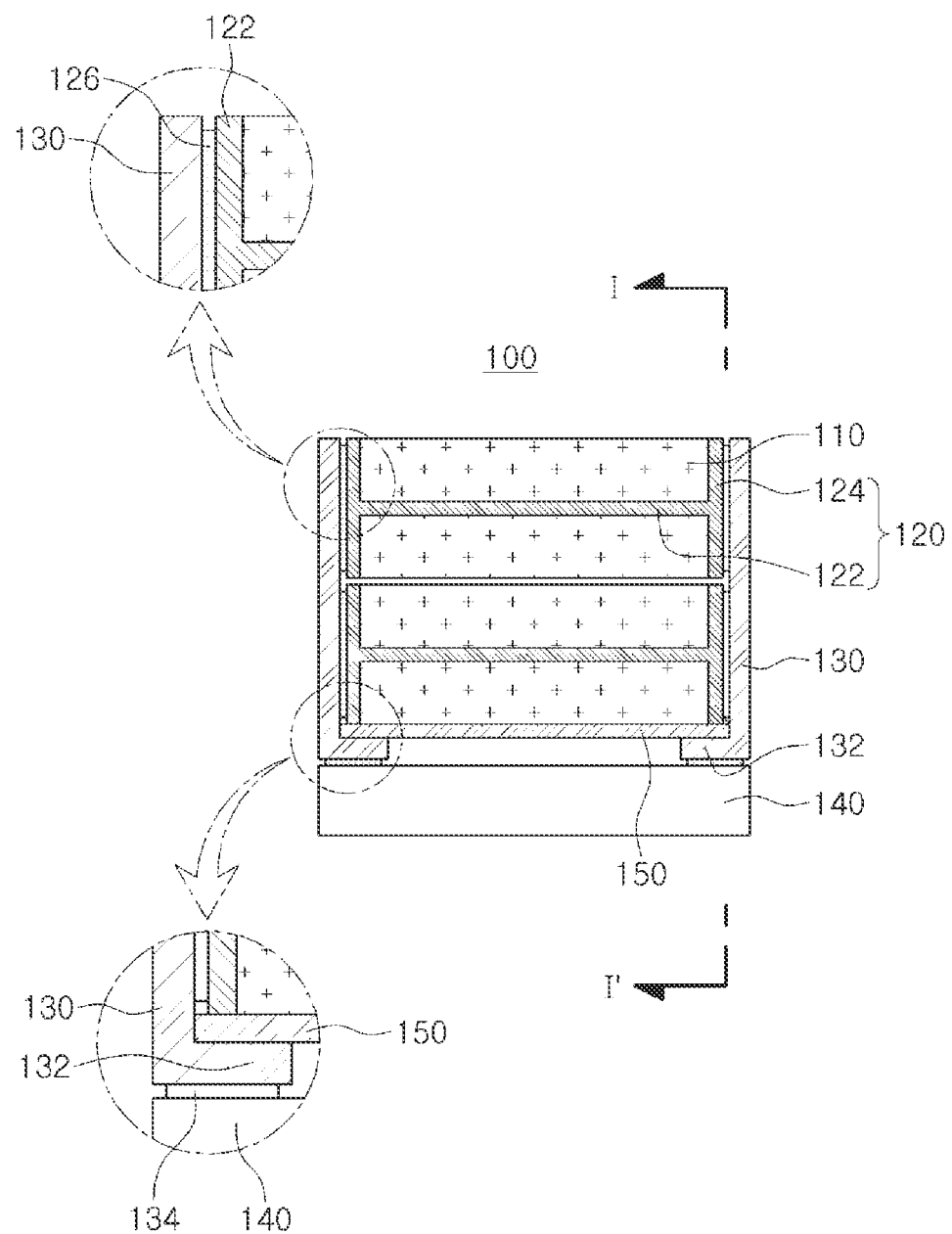
FIG. 2 is a cross-sectional view of a battery module according to an exemplary embodiment in the present disclosure.

FIG. 2 is a cross-sectional view of a battery module according to another exemplary embodiment in the present disclosure.

Referring to FIG. 2, a battery module 100 of the present exemplary embodiment may include a battery cell 110, a cooling fin 120, a side cooling fin 130, and a heat sink 140.

The battery cell 110 may be formed such that the length of the horizontal length of the front surface thereof is longer than the vertical length thereof, and may be formed in a hexahedral shape as a whole.

The battery cell 110 may be provided as a single unit, but may preferably be provided in a plurality of units for supplying stable power and providing sufficient capacity. In the present exemplary embodiment, the battery cell 110 may be formed of a plurality of battery cells, and it may be disposed being stacked up and down in a state in which a larger surface is installed laid down toward the lower portion.

In addition, the battery module 100 according to the present exemplary embodiment may be provided with a cooling structure for cooling the battery cell 110. With the cooling structure provided for this purpose, a cooling fin cooling the battery cell 110 may be provided.

The cooling fin 120 may be configured including a first cooling part 122 disposed between the adjacent battery cells 110 and contacting upper and lower surfaces of the battery cells 110, and a second cooling part 124 extending from both side surfaces of the first cooling part 122 and contacting both side surfaces of the battery cells 110 in contact with the first cooling part 122. For example, the cooling fin 120 may be formed in an 'H' shape, and the battery cell 110 may be inserted into openings of the upper and lower portions and be contacted.

In addition, a side cooling fin 130 may be installed to be in contact with a side surface of the second cooling part 124 of the cooling fin 120. The side cooling fin 130 may transfer heat of the battery cell 110 transferred through the cooling fin 120 to the heat sink 140 located in the lower portion, as to be in contact with the second cooling part 124.

An ground part 132 bent to contact the upper surface of the heat sink 140 may be formed in the lower portion of the side cooling fin 130 to improve a contact area with the heat sink 140.

On the other hand, in the heat sink 140 disposed in the lower portion of the side cooling fin 130, a water-cooled cooling means may be further connected or may be provided therein.

In addition, in the present exemplary embodiment, the cooling fin 120 and the side cooling fin 130 may be formed of a material having excellent thermal conductivity, and may be formed of, for example, copper, aluminum, or alloys thereof.

In addition, between the cooling fin 120 and the side cooling fin 130, a conductive member 126 may be provided for improving heat transfer efficiency.

In addition, a conductive member 134 for improving heat transfer efficiency may be provided between the ground part 132 of the side cooling fin 130 and the heat sink 140.

Here, the conductive members 126 and 134 may be provided in a form of a paste, and may include copper, aluminum, silver, or the like, excellent in terms of heat transfer efficiency.

On the other hand, in the drawings of the present exemplary embodiment, the conductive members 126 and 134 may be exaggerated for explanatory purposes, and may be applied to have a substantially thin thickness. In addition, although the conductive member is not disclosed other than the above-mentioned portion in the drawings, the conductive member may be provided in the connection part in which electric heat is generated, such as the battery cell, the cooling fin, and the like. In the other drawings, the conductive member is omitted.

On the other hand, in the battery module 100, a battery cell 110 adjacent to the heat sink 140, for example, the battery cell 110 located at the lowermost portion may be supercooled as compared with the other battery cells 110 as it is adjacent to the heat sink 140.

As described above, when one battery cell 110 is overheated or overcooled in the plurality of battery cells 110 and temperature deviation occurs, a difference in performance with the other battery cells 110 occurs, thereby causing a failure, and accordingly, a protective circuit for limiting the performance of the battery cell 110 in which the temperature deviation has occurred and the other battery cells 110 is applied, a cause of deterioration of the overall performance.

Therefore, in the present exemplary embodiment, an insulation member 150 blocking excessive heat transfer to the battery cell 110 adjacent to the heat sink 140, in other words, to the lower portion of the battery cell 110 located at the lowermost portion (in detail, heat sink) may be provided.

The insulation member 150 may be provided as an insulation PAD, and may prevent overcooling of the battery cell 110 located at a lowermost end to improve overall battery performance.

On the other hand, a space may be formed between the battery cell located at the lowermost portion and the heat sink 140 to block direct contact between the battery cell located at the lowermost portion and the heat sink 140. Further, even when the insulation member 150 is provided as described above, a space may be formed between the insulation member 150 and the heat sink 140.

In the battery module 100 configured as described above, heat generated in each battery cell 110 may be transferred to the second cooling part 124 through the first cooling part 122, or may be directly transferred to the second cooling part 124 and may be transferred to the side cooling fin 130 located on the side surface. And, the side cooling fin 130 may transfer heat to the heat sink 140 located in the lower portion, and finally the heat may be dissipated in the heat sink 140 and cooled.

As described above, the battery module of the present exemplary embodiment may reduce the overall height as the battery cell 110 is disposed in a laid-down state. Further, the battery module 100 may be provided with a structure in which the heat generated in the battery cell 110 is discharged through both sides, thereby increasing the cooling rate and achieving more uniform cooling during the cooling process.

Figure 3:
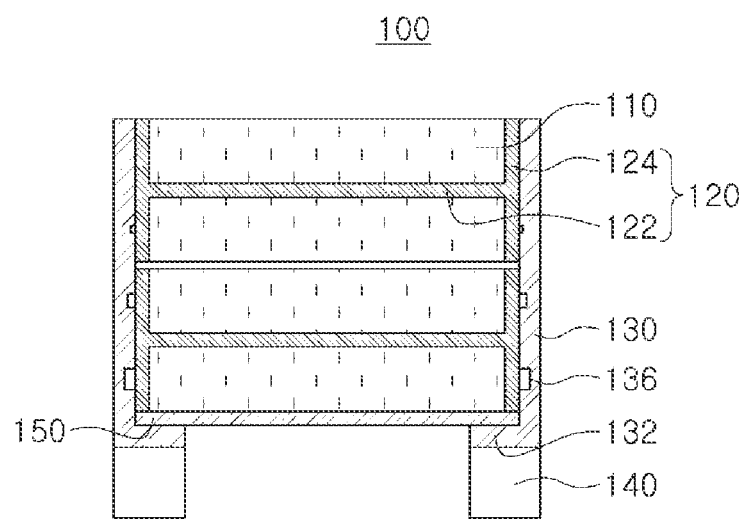
FIG. 3 is a cross-sectional view of a battery module according to another exemplary embodiment in the present disclosure.

FIG. 3 is a cross-sectional view of a battery module 100 according to another exemplary embodiment in the present disclosure.

Referring to FIG. 3, the battery module 100 of the present exemplary embodiment may include a cooling fin 120 configured including a first cooling part 122 contacting front and rear surfaces of adjacent battery cells 110, and a second cooling part 124 extending from both sides of the first cooling part 122 and contacting a side surface of the battery cell 110 contacting the first cooling part 122.

In addition, the side cooling fin 130 transferring heat to the heat sink 140 located in the lower portion may be installed to be in contact with the side surface of the cooling fin 120.

In addition, the battery module 100 may be provided with the insulation member 150 blocking heat transfer to the battery cell 110 adjacent to the heat sink 140, in detail, to the lower portion of the battery cell 110 located at the lowermost portion.

The insulation member 150 may be provided as the insulation PAD, and may prevent overcooling of the battery cell 110 located at the lowermost end, thereby improving overall battery performance.

On the other hand, a cooling rate of the side cooling fin 130 may be faster in the lower portion adjacent to the heat sink 140 than in the upper portion. Thus, the side cooling fins 130 may include notch grooves 136 formed corresponding to respective battery cells 110 on a surface contacting the cooling fin 120, to significantly reduce temperature deviation between upper and lower portions of the side cooling fins 130. Here, sizes of the notch grooves 136 may be increased as the notch grooves 136 are adjacent to the heat sink 140, and a contact area with the cooling fin 120 may be reduced as the side cooling fin 130 is adjacent to the heat sink 140 by the notch grooves 136.

As described above, in the present exemplary embodiment, to solve the problem in which the cooling rate of the lower portion of the side cooling fin 130 is faster than the upper portion of the side cooling fin 130, the temperature deviation between the upper portion and the lower portion may be significantly reduced as a whole by forming the notch grooves 136 corresponding to the battery cells 110 on the surface contacting the cooling fin 120 and increasing as in the lower portion.

The sizes and depths of the notch grooves 136 are preferably appropriately designed considering the reduction of the contact area and an amount of air passing through between the notch grooves 136, and the like.

Further, in the present exemplary embodiment, various modifications are possible to significantly reduce the temperature deviation between the battery cells 110, the contact surface and the contact resistance may be changed by changing shapes, numbers, and arrangement patterns of the notch grooves 136, and the like, and further, application areas, components, shapes, and the like of the conductive members may be made differently.

Further, in the present exemplary embodiment, the heat sink 140 may be designed in consideration of the overall heat generation amount of the battery module 100, and the like, and for example, may be provided in a single structure, and may be provided in a divided structure depending on the heat generation amount of the battery module 100.

In the present exemplary embodiment, the shape of the side cooling fin 130 may not be limited, and various shapes and structures may be changed to improve performance.

Figure 4:
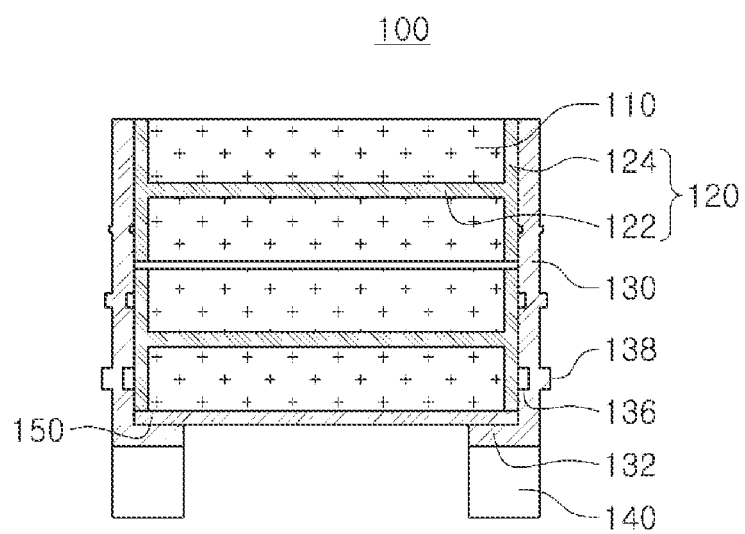
FIG. 4 is a cross-sectional view of a battery module according to another exemplary embodiment in the present disclosure.

For example, referring to FIG. 4, a cross-sectional view of the battery module 100 according to another exemplary embodiment in the present disclosure, the side cooling fin 130 may include the notch groves 136 formed to correspond to respective battery cells 110 on the surface contacting the cooling fin 120 and increased to decrease the contact area with the cooling fin 120 as to be adjacent to the heat sink 140.

Further, the side cooling fin 130 may have a reduced transfer area of heat transferred from the upper portion to the lower portion due to the notch grooves 136, thereby causing heat condensation or heat sinking in the notch grooves 136.

Thus, in the present exemplary embodiment, a protrusion part 136 for increasing the heat transfer cross-sectional area may be formed to compensate for the reduced heat transfer cross-sectional area of the side cooling fin 130 on the surface facing the notch grooves 136 in the side cooling fin 130.

Although the protrusion part 136 is disclosed as being formed in a shape corresponding to the notch grooves 136 in the present exemplary embodiment, the shape of the protrusion part 138 may not be limited and may be modified into a semicircular, a semi-elliptical shape, or the like.

Figure 5:
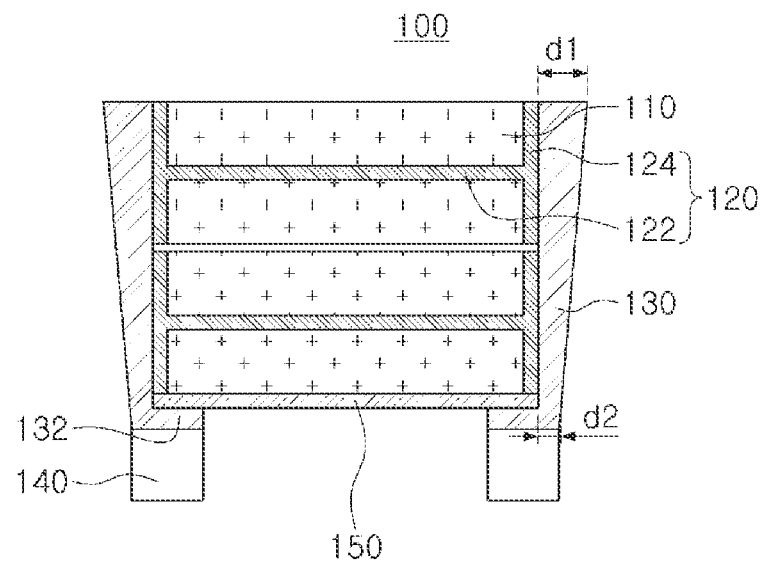
FIG. 5 is a cross-sectional view of a battery module according to another exemplary embodiment in the present disclosure.

Further, referring to FIG. 5, a cross-sectional view of battery module 100 according to another exemplary embodiment in the present disclosure, the thickness of the side cooling fin 130 may be reduced such that the heat transfer cross-sectional area decreases as it is adjacent to the heat sink 140.

In other words, the side cooling fin 130 may have a higher cooling rate in the lower portion adjacent to the heat sink 140 than in the upper portion. Thus, to significantly reduce the temperature deviation between the upper and lower portions of the side cooling fin 130, the side cooling fin 130 according to the present exemplary embodiment may be thicker in the upper portion far from the heat sink 140 than in the lower portion, and the thickness of the side cooling fin 130 may be decreased toward the lower portion. In other words, an upper end thickness d1 may be larger than a lower end thickness d2 of the side cooling fin 130.

According to the structure, a heat transfer rate of the side cooling fin 130 may be increased at the upper portion and a heat transfer rate of the side cooling fin 130 may decrease in the lower portion.

As described above, to solve the problem in which the cooling rate is faster in the lower portion than at the upper portion, the thickness of the side cooling fin 130 is reduced from the upper portion to the lower portion, thereby significantly reducing the temperature deviation between the upper portion and the lower portion as a whole.

In addition, although the cooling fin 120 in the present exemplary embodiment is described as being formed with a single unit structure of the first cooling part 122, the structure of the cooling fin 120 including the first cooling part 122 may not be limited thereto, and may be variously modified.

Figure 6:
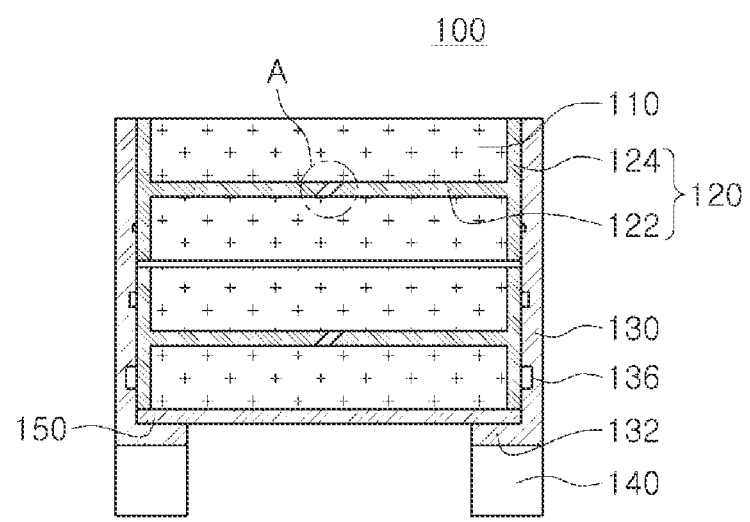
FIG. 6 is a cross-sectional view of a battery module according to another exemplary embodiment in the present disclosure.

For example, referring to FIG. 6, a cross-sectional view of a battery module according to another exemplary embodiment in the present disclosure, the cooling fin 120 may be expanded or contracted with respect to a temperature change of the battery cell 110, and may be provided dividedly to prevent deformation of the battery cell 110 in response to the temperature change.

Preferably, the first cooling part 122 may be provided in a divided structure with respect to a part, for example, a central portion A. The central portion A of the first cooling part 122 may be divided in a state in which the battery cell is in a low temperature, and may be provided with a length corresponding to a maximum expansion corresponding to an allowable temperature rise of the battery cell 110.

In addition, preferably, the first cooling part 122 may be formed in a shape in which the central divided cross-section is inclined, thereby preventing sharp temperature changes in the divided portions.

Figure 7A:
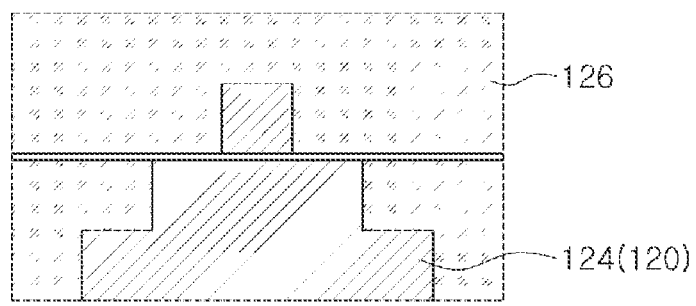
FIGS. 7(a) and 7(b) are side views illustrating a cooling fin of a battery module according to another exemplary embodiment in the present disclosure.
Figure 7B:
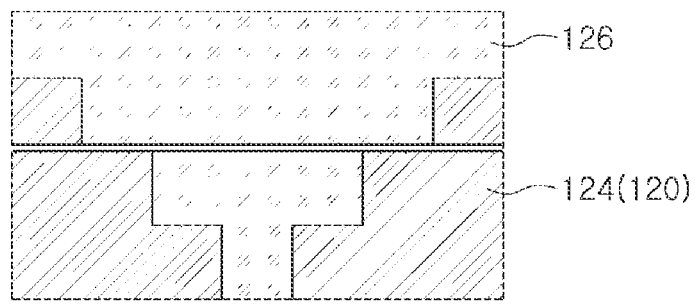

In addition, FIGS. 7(a) and 7(b) are cross-sectional views of a battery module according to another exemplary embodiment in the present disclosure, which illustrates cross-sections corresponding to I-I' of FIG. 2.

As the battery module 100 illustrated in FIG. 2, in the battery module 100 of the present exemplary embodiment, a conductive member 126 for improving heat transfer efficiency between the cooling fin 120 and the side cooling fin (130 of FIG. 2) may be provided.

Here, heat generated in respective battery cells 110 may be transferred to the side cooling fin 130 through the cooling fin 120.

On the other hand, the side cooling fin 130 may have a faster cooling rate in the lower portion adjacent to the heat sink (140 of FIG. 2) than in the upper portion. Accordingly, the cooling fin 120 contacting the upper battery cell (110 of FIG. 2) and the cooling fin 120 contacting the lower battery cell 110 may be different in terms of cooling speed by the side cooling fin 130.

To prevent the difference, as illustrated in FIG. 7, in the present exemplary embodiment, the shape of the conductive member 126 provided between the second cooling part 124 and the side cooling fin 130 may be made differently.

For example, as illustrated in FIGS. 7(a) and 7(b), the conductive member 126 may be formed such that the area applied to the upper cooling fin 120 is larger than the area applied to the lower cooling fin 120.

Thus, the cooling efficiency of the upper cooling fin 120 may be improved, by the conductive member 126, which is more widely applied to the upper portion than the lower portion.

As described above, in the present exemplary embodiment, to solve the problem in which the cooling rate is faster in the lower portion than in the upper portion, the application area of the conductive member 126 provided on a surface contacting the cooling fin 120 may be formed to be reduced from the upper portion to the lower portion, such that the temperature deviation between the upper portion and the lower portion may be significantly reduced as a whole.

The shape in which the conductive member 126 is applied may be formed to have a smaller application area from the outside to the inside, as illustrated in FIG. 7A, and as illustrated in FIG. 7B, it may be formed to have a smaller application area from the central portion to the outside.

In addition, the conductive member 126 may be divided into a plurality of segments, or may be provided in a circular shape, and may have a high distribution ratio in an upper portion and a lower distribution ratio in a lower portion.

In addition, the conductive member 126 may be formed to have the same application area in the upper and lower portions, but the different ratios of the components applied to the upper and lower portions. In other words, the conductive member 126 may be formed by applying a high-conductive component to the upper portion and increasing a component having a lower conductivity toward the lower portion.

While the present invention has been described with reference to exemplary embodiments in the present disclosure is not limited thereto, but various modifications may be made within the technical ideas of the present disclosure.

The invention claimed is:

1. A battery module comprising:
a plurality of battery cells including a first battery cell and a second battery cell, stacked on the first battery cell;
a cooling fin including a first cooling part contacting an upper surface of the first battery cell and a lower surface of the second battery cell, and a second cooling part extending from both side surfaces of the first cooling part; and
a side cooling fin transferring heat of the cooling fin to a heat sink located in the lower portion of the side cooling fin,
wherein the cooling fin contacts a side surface of the first battery cell and a side surface of the second battery cell, respectively.

2. The battery module of claim 1, further comprising an insulation member provided in a lower portion of the plurality of battery cells adjacent to the heat sink.

3. The battery module of claim 1, further comprising a conductive member provided between the cooling fin and the side cooling fin.

4. The battery module of claim 3, wherein the conductive member has an area reduced from an upper portion to a lower portion.

5. The battery module of claim 1, further comprising a conductive member provided between the side cooling fin and the heat sink.

6. The battery module of claim 1, wherein the side cooling fin comprises notch grooves formed corresponding to each battery cell, and a size of the notch grooves is increased from an upper portion to a lower portion.

7. The battery module of claim 6, wherein the side cooling fin comprises a protrusion part formed to correspond to the notch groove, and the protrusion part and the notch groove are formed on opposite sides of the side cooling fin.

8. The battery module of claim 1, wherein a thickness of the side cooling fin has an area reduced from the upper portion to the lower portion.

9. The battery module of claim 1, wherein the cooling fin is formed by dividing a part of the first cooling part.

* * * * *